(12) United States Patent
Imai et al.

(10) Patent No.: US 8,094,103 B2
(45) Date of Patent: Jan. 10, 2012

(54) VIEWING-ANGLE CONTROL DEVICE, DISPLAY APPARATUS, METHOD FOR CONTROLLING VIEWING-ANGLE CONTROL DEVICE, VIEWING-ANGLE CONTROL PROGRAM, AND STORAGE MEDIUM STORING THE PROGRAM

(75) Inventors: Akira Imai, Nara (JP); Tomoo Takatani, Nara (JP); Koji Yabuta, Kashiba (JP); Hiroshi Fukushima, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 403 days.

(21) Appl. No.: 11/574,375

(22) PCT Filed: Aug. 29, 2005

(86) PCT No.: PCT/JP2005/015661
§ 371 (c)(1),
(2), (4) Date: Feb. 27, 2007

(87) PCT Pub. No.: WO2006/025326
PCT Pub. Date: Mar. 9, 2006

(65) Prior Publication Data
US 2007/0291024 A1    Dec. 20, 2007

(30) Foreign Application Priority Data
Aug. 31, 2004    (JP) .................... 2004-253581

(51) Int. Cl.
*G09G 3/36* (2006.01)
(52) U.S. Cl. .......................... 345/87; 345/204
(58) Field of Classification Search .......... None
See application file for complete search history.

(56) References Cited

U.S. PATENT DOCUMENTS 4,626,851 A    12/1986  Tooze
4,953,949 A    9/1990   Dallas
(Continued)

FOREIGN PATENT DOCUMENTS

JP    09-105958 A    4/1997
(Continued)

OTHER PUBLICATIONS

Official Communication for PCT Application No. PCT/JP2005/015661 mailed on Oct. 25, 2005.
(Continued)

*Primary Examiner* — Amare Mengistu
*Assistant Examiner* — Antonio Xavier
(74) *Attorney, Agent, or Firm* — Keating & Bennett, LLP (57) ABSTRACT

A control section of a portable phone controls a viewing-angle changing section that changes a viewing angle of an image display section and controls the viewing angle of the image display section on the basis of a status of use of various devices. The control section includes: a device-in-use detecting section to detect use of the devices; a storage section to store a device/viewing-angle matching table containing a correspondence relationship between a device to be used and a viewing angle; a viewing-angle retrieving section to retrieve, from the table, a viewing angle for the device detected being in use by the device-in-use detecting section; and a viewing-angle control section to control the viewing-angle changing section on the basis of the viewing angle retrieved by the viewing-angle retrieving section. The foregoing allows the viewing angle to be controlled automatically on the basis of the status of use, with a few settings.

13 Claims, 7 Drawing Sheets

| DEVICE IN USE | VIEWING ANGLE | PRIORITY |
|---|---|---|
| AC POWER SOURCE CIRCUIT | WIDE | LOWER |
| BATTERY | NARROW | HIGHER |
| SPEAKER | WIDE | HIGHER |
| EARPHONE | NARROW | LOWER |
| AUDIO OUTPUT CONNECTOR | NARROW | LOWER |
| CAMERA | WIDE | HIGHER |
| TEN-KEY | NARROW | LOWER |

U.S. PATENT DOCUMENTS

| | | | |
|---|---|---|---|
| 5,513,334 A * | 4/1996 | Alexander | 711/103 |
| 5,519,533 A | 5/1996 | Nomura et al. | |
| 5,638,082 A | 6/1997 | Grimm | |
| 5,642,214 A | 6/1997 | Ishii et al. | |
| 5,787,152 A * | 7/1998 | Freadman | 379/88.01 |
| 5,831,698 A * | 11/1998 | Depp et al. | 349/64 |
| 5,899,551 A | 5/1999 | Neijzen et al. | |
| 5,945,965 A | 8/1999 | Inoguchi et al. | |
| 6,205,554 B1 | 3/2001 | Sasaki et al. | |
| 6,445,434 B2 | 9/2002 | Takato et al. | |
| 6,449,492 B1 * | 9/2002 | Kenagy et al. | 455/550.1 |
| 6,662,022 B1 * | 12/2003 | Kanamori et al. | 455/556.1 |
| 6,954,185 B2 | 10/2005 | Ogino | |
| 6,987,550 B2 | 1/2006 | Takato et al. | |
| 7,272,232 B1 * | 9/2007 | Donaldson et al. | 381/55 |
| 7,330,178 B2 | 2/2008 | Yorio et al. | |
| 7,486,350 B2 | 2/2009 | Yabuta et al. | |
| 2001/0026330 A1 | 10/2001 | Oh | |
| 2002/0078393 A1 * | 6/2002 | Parker | 713/324 |
| 2003/0001878 A1 * | 1/2003 | Matsumoto | 345/716 |
| 2003/0007227 A1 | 1/2003 | Ogino | |
| 2003/0011704 A1 * | 1/2003 | Sawachi | 348/372 |
| 2003/0146893 A1 | 8/2003 | Sawabe | |
| 2003/0147112 A1 | 8/2003 | Mukawa | |
| 2003/0195421 A1 | 10/2003 | Demers et al. | |
| 2004/0027474 A1 * | 2/2004 | Aoyama et al. | 348/335 |
| 2004/0029546 A1 * | 2/2004 | Tsuchi et al. | 455/159.1 |
| 2004/0033812 A1 * | 2/2004 | Matsunaga et al. | 455/557 |
| 2004/0041911 A1 * | 3/2004 | Odagiri et al. | 348/207.1 |
| 2004/0085353 A1 * | 5/2004 | Kawakami et al. | 345/747 |
| 2004/0100598 A1 | 5/2004 | Adachi et al. | |
| 2004/0174430 A1 * | 9/2004 | Sawahara et al. | 348/14.02 |
| 2004/0185920 A1 * | 9/2004 | Choi et al. | 455/575.1 |
| 2004/0207594 A1 * | 10/2004 | Kubo | 345/100 |
| 2004/0252258 A1 | 12/2004 | Matsushima | |
| 2004/0252679 A1 * | 12/2004 | Williams et al. | 370/356 |
| 2005/0020325 A1 * | 1/2005 | Enger et al. | 455/575.3 |
| 2005/0143124 A1 * | 6/2005 | Kennedy et al. | 455/556.1 |
| 2005/0215291 A1 | 9/2005 | McDonald | |
| 2005/0243265 A1 | 11/2005 | Winlow et al. | |
| 2005/0286000 A1 | 12/2005 | Tsai et al. | |
| 2006/0066794 A1 | 3/2006 | Hotta et al. | |

FOREIGN PATENT DOCUMENTS

| | | |
|---|---|---|
| JP | 10-153968 A | 6/1998 |
| JP | 10-240186 A | 9/1998 |
| JP | 10-319373 A | 12/1998 |
| JP | 11-007045 A | 1/1999 |
| JP | 11-174489 A | 7/1999 |
| JP | 2001-264768 A | 9/2001 |
| JP | 2001-318374 A | 11/2001 |
| JP | 2001-344050 A | 12/2001 |
| JP | 2003-099192 A | 4/2003 |
| JP | 2003-298715 A | 10/2003 |
| JP | 2004-038035 A | 2/2004 |
| JP | 2004-062094 A | 2/2004 |
| JP | 2004-133334 A | 4/2004 |
| JP | 2004-233527 A | 8/2004 |
| JP | 2004-279793 A | 10/2004 |
| JP | 2005-260858 A | 9/2005 |
| JP | 2005-292586 A | 10/2005 |
| JP | 2005-316470 A | 11/2005 |
| JP | 2005-345799 A | 12/2005 |
| JP | 2006-003754 A | 1/2006 |
| JP | 2006-011451 A | 1/2006 |
| JP | 2006-064882 A | 3/2006 |
| JP | 2006-098784 A | 4/2006 |
| KR | 2000-0039870 A | 7/2000 |
| KR | 2003-0040345 A | 5/2003 |

OTHER PUBLICATIONS

Akira Imai et al.; "Display Control Device, Display Apparatus, Method of Controlling Display Device, Display Control Program, and Storage Medium Storing the Program"; filed Feb. 27, 2007.

Tomoo Takatani et al.; "Display Device, Viewing Angle Control Device, and Electronic Apparatus"; U.S. Appl. No. 11/574,609, filed Mar. 2, 2007.

Hiroshi Fukushima et al.; "Display Device, Viewing Angle Control Device, and Electronic Apparatus"; U.S. Appl. No. 11/575,112, filed Mar. 12, 2007.

Koji Yabuta et al.; "Display Device, Viewing Angle Control Device, and Electronic Device"; U.S. Appl. No. 11/575,244, filed Mar. 14, 2007.

Koji Yabuta et al.; "Display Device and Electronic Apparatus", U.S. Appl. No. 11/576,555, filed Apr. 3, 2007.

Official Communication issued in corresponding U.S. Appl. No. 11/574,609, mailed on Dec. 8, 2009.

Official Communication issued in corresponding U.S. Appl. No. 11/574,371, mailed on Jan. 12, 2010.

* cited by examiner

| DEVICE IN USE | VIEWING ANGLE | PRIORITY |
|---|---|---|
| AC POWER SOURCE CIRCUIT | WIDE | LOWER |
| BATTERY | NARROW | HIGHER |
| SPEAKER | WIDE | HIGHER |
| EARPHONE | NARROW | LOWER |
| AUDIO OUTPUT CONNECTOR | NARROW | LOWER |
| CAMERA | WIDE | HIGHER |
| TEN-KEY | NARROW | LOWER |

FIG. 7

VIEWING-ANGLE CONTROL DEVICE, DISPLAY APPARATUS, METHOD FOR CONTROLLING VIEWING-ANGLE CONTROL DEVICE, VIEWING-ANGLE CONTROL PROGRAM, AND STORAGE MEDIUM STORING THE PROGRAM

BACKGROUND OF THE INVENTION

1. Field of the Invention

The present invention relates to: a viewing-angle control device to control a viewing angle of a display device; a display apparatus; a method for controlling a viewing-angle control device; a viewing-angle control program; and a storage medium storing the program.

2. Description of the Related Art

Conventionally, liquid crystal displays (LCD) have been widely employed as display devices of portable electronics devices such as portable phones and PDAs (Personal Digital Assistant). Having narrow viewing angles, LCDs have been considered to be disadvantageous compared with CRTs (Cathode Ray Tube) and plasma displays, but recent advancement in LCD technologies has allowed widening of the viewing angles.

However, there is a possibility that, when the portable electronics devices are used in crowded situations in trains, buses, and the like, people around the portable electronics devices peek at what is displayed on a display screen of the portable electronics devices. Especially in creating or reading an electronic mail, it is undesirable in view of privacy that details of the electronic mail are peeked by people around the portable electronics devices.

In response to this problem, there has been suggested an LCD that allows controlling a viewing angle (see Patent Documents 1 to 4, for example). Generally, such LCDs are switchable, from one to the other, between a normal wide viewing-angle mode and a narrow viewing-angle mode, in which the viewing angle is narrow. The narrow viewing-angle mode is a mode in which a displayed image is visible in a normal way from the direct front of the display screen where the user is, and a plain image or a different image is visible from a sideward direction.

For example, in the viewing-angle variable device of Patent Document 1 (Japanese Unexamined Patent Publication No. 105958/1997 (Tokukaihei 9-105958) (publication date: Apr. 22, 1997)), a liquid crystal layer between a pair of substrates becomes a narrow viewing-angle when liquid crystal molecules are aligned vertically to the substrates, while the layer becomes a wide viewing-angle when the molecules are aligned parallel to the substrates. Further, in the portable terminal device of Patent Document 2 (Japanese Unexamined Patent Publication No. 62094/2004 (publication date: Feb. 26, 2004)), the viewing angle of the information displaying means is changed by changing an alignment of liquid crystal between two glass plates.

Further, there has also been a display apparatus divided into several sections, each of which is differentiated from one another in alignment direction and the like, whereby, during the narrow viewing-angle mode, an image different from what is displayed on a display screen is visible when the display screen is seen from a direction other than the front. For example, Patent Document 3 (Japanese Unexamined Patent Publication No. 264768/2001 (publication date: Sep. 26, 2001)) teaches a liquid crystal display apparatus in which alignment layers sandwiching a liquid crystal layer are divided into a plurality of areas, each of which is differentiated in alignment direction from its adjacent areas. Further, Patent Document 4 (Japanese Unexamined Patent Publication No. 38035/2004 (publication date: Feb. 5, 2004)) teaches a liquid crystal display apparatus in which a first liquid crystal cell and a second liquid crystal cell are alternately disposed, and the first liquid crystal cell and the second liquid crystal cell are different in viewing-angle direction from each other.

Furthermore, in the portable terminal device of Patent Document 2, the viewing angle is controlled on the basis of a type of an application being executed. This makes it possible to change the viewing angle automatically on the basis of a situation of use, allowing the user to avoid bothersome operation to determine the viewing angle every time.

In recent years, as CPU has improved in processing capacity and has increased in storage capacity, the number of application to be installed has increased not only in ordinary electronics devices but also in portable electronic devices. Therefore, it is a burden to manufacturers and users to set a viewing angle for every application to be used.

SUMMARY OF THE INVENTION

The present invention is in view of the above problems, and has as an object to provide a viewing-angle control device, a display apparatus, a method for controlling a viewing-angle control device, a viewing-angle control program, and a storage medium storing the program, for allowing, with a fewer settings, the viewing angle to be changed automatically on the basis of a status of use.

To solve the above problems, a viewing-angle control device according to the present invention for controlling a viewing angle of a display device is configured in such a way as to control the viewing angle on the basis of a status of use of one or plural devices.

Further, a method according to the present invention for controlling a viewing-angle control device to control a viewing angle of a display device includes: controlling the viewing angle of the display device on the basis of a status of use of one or plural devices.

It is possible to indicate the viewing angle by indicating an actual value thereof or a level of the viewing angle, e.g. the viewing angle is wide, and the viewing angle is narrow.

In the above configuration, the viewing angle of the display device is controlled not on the basis of a status of use of an application but a status of use of various devices. Hence, the viewing angle is set not for every application to be used but for every device to be used.

Generally, plural pieces of software are utilized with respect to one hardware such as a device. For example in a portable phone with a camera, the camera is utilized in taking a moving image and in taking a photograph, and ten-keys are utilized in inputting telephone numbers to call, creating electronic mails, and registering in a telephone directory.

Hence, the viewing-angle control device of the present invention allows the viewing angle to be controlled automatically on the basis of the status of use, with a fewer settings than before.

It is preferable that the display device be controlled to display information on the viewing angle. In this case, a user can easily find out the viewing angle by simply looking at the display screen of the display device, even when the viewing angle is changed automatically on the basis of a status of use of various devices.

Further, it is possible to select any display style in displaying the viewing angle, including: displaying by use of a series of characters; displaying by use of an icon; displaying at an upper end section, a lower end section, or a corner section of the display screen; displaying at a central section of the display screen in such a way as to superimpose with other images; and displaying by use of a moving image.

Additional objects, features, and strengths of the present invention will be made clear by the description below. Further, the advantages of the present invention will be evident from the following explanation in reference to the drawings.

DETAILED DESCRIPTION OF THE PREFERRED EMBODIMENTS

The following discusses an embodiment of the present invention, with reference to FIGS. 1 to 7.

Figure 2:
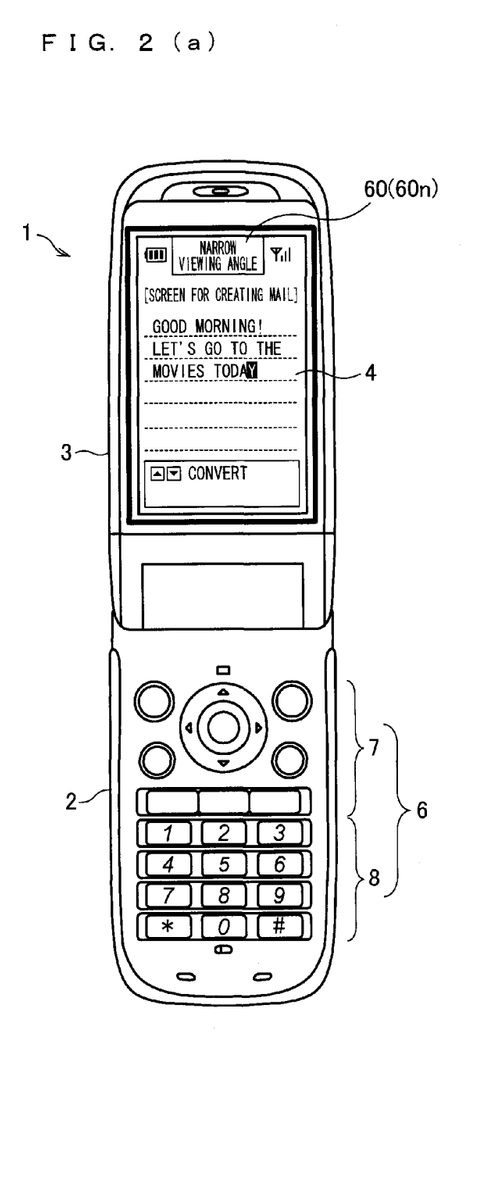
FIG. 2(a) is a front view showing an exterior of the portable phone that is opened.
FIG. 2(b) is a rear view showing an exterior of the portable phone that is opened.

FIG. 2 shows an exterior of a portable phone (display apparatus) 1 according to an embodiment of the present invention. The portable phone 1 of the present embodiment is so-called clamshell type. The portable phone 1 being opened is shown in the figure. FIG. 2(a) shows a section of the portable phone 1, which section becomes the inside when the portable phone 1 is closed. This section is a section to be used mainly by a user when the portable phone 1 is opened. Accordingly, the section shown in FIG. 2(a) will be referred to as a front-surface side in the present application. Further, FIG. 2(b) shows a section of the portable phone 1, which section becomes outside when the portable phone 1 is closed. This section becomes the opposite section of the section shown in FIG. 2(a) when the portable phone 1 is opened. Accordingly, the section shown in FIG. 2(b) will be referred to as a rear-surface side in the present application.

As shown in FIG. 2, the portable phone 1 includes a main body 2 and a cover 3. The main body 2 and the cover 3 are coupled together with a hinge. The cover 3 is provided with a main screen 4 on the front-surface side and a sub screen 5 on the rear-surface side. Although it is not shown in the figure, an antenna is provided in the cover 3.

The main body 2 is provided with main operation buttons (operating means) 6 on the front-surface side. The main operation buttons 6 includes: function buttons 7 for doing various settings and switching functions of the portable phone 1; and input buttons (input means) 8 for inputting symbols such as numbers and characters. Specifically, the function buttons 7 include: a power button for switching ON/OFF a power source of the portable phone; a camera button for starting up a camera mode; a mail button for starting up a mail mode; a cross button for moving a selected object upward, downward, leftward, and/or rightward; an enter button, disposed at a center of the cross button, for entering various selections; and the like. The input buttons 8 are ten-keys. A camera 9 is provided to the rear-surface side of the main body 2.

The portable phone 1 of the present embodiment has a function of controlling a viewing angle of the main screen 4 so as to switch, from one to the other, a wide viewing-angle mode and a narrow viewing-angle mode. The user operates a predetermined operation button to switch the viewing-angle mode. A variety of configurations for changing the viewing angle have been known. For example Patent Documents 1, 3, and 4 teach such configurations. Thus, description thereof is omitted.

In the present embodiment, the viewing-angle mode is switched automatically on the basis of a status of use of some or all of the devices included in the portable phone 1. For example, the viewing-angle mode automatically becomes the wide viewing-angle mode when the camera 9 operates, and the viewing-angle mode automatically becomes the narrow viewing-angle mode when the input buttons 8 are operated.

There are a plurality of applications to utilize the camera 9, such as taking a moving image and taking a photograph (static image). To set a viewing angle for each of the applications, a plurality of settings are needed. Meanwhile, a live view image is displayed on the main screen 4 both in taking a moving image and in taking a photograph. Further, the portable phone 1 is often positioned at a variety of locations and angles in taking moving images and photographs. Therefore, it is preferable that the main screen 4, on which live view images are to be displayed, be the wide viewing-angle.

On the other hand, there are a plurality of applications to utilize the input buttons 8, such as creating an electronic mail, registering in a telephone directory, entering schedules and memoranda, and inputting telephone numbers to call. To set a viewing angle for each of the applications, a plurality of settings are needed.

Most of the information discussed above relates to privacy. Therefore, it is preferable in inputting information into the portable phone 1 that the main screen 4 be the narrow viewing-angle.

Hence, in the present embodiment, the viewing angle is set in a manner such that the viewing-angle mode becomes the wide viewing-angle mode when the camera operates and becomes the narrow viewing-angle mode when the input buttons 8 are operated. This makes it possible to reduce the number of settings, compared to conventional cases in which a viewing angle is set for every application.

Further, as shown in FIG. 2, the main screen 4 in the portable phone 1 of the present embodiment displays viewing-angle information 60, which indicates a viewing-angle state. This allows a user to easily find out the viewing-angle state by simply looking at the main screen 4 from the front, even when the viewing-angle state changes automatically on the basis of a status of use of various devices. Although the viewing-angle information 60 is displayed at a central section of an upper section of the main screen 4 in the case shown in the figure, it is also possible to display the viewing-angle information 60 at any section in the display screen 4. Further, although the viewing-angle information 60 is expressed with a series of characters in the case shown in the figure, it is also possible to express the viewing-angle information 60 with a figure such as an icon.

Figure 3:
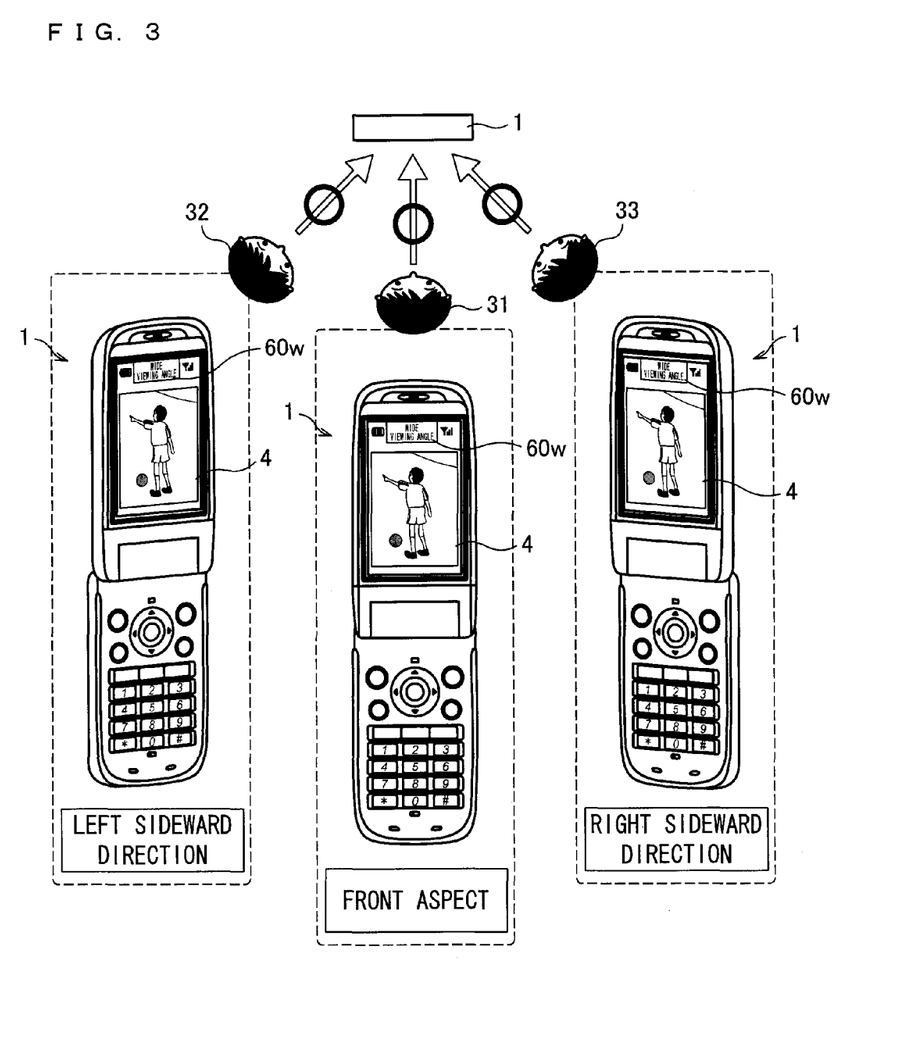
FIG. 3 is a drawing showing display screens that are visible from the front or sideward directions, when the portable phone is set in a wide viewing-angle mode.
Figure 4:
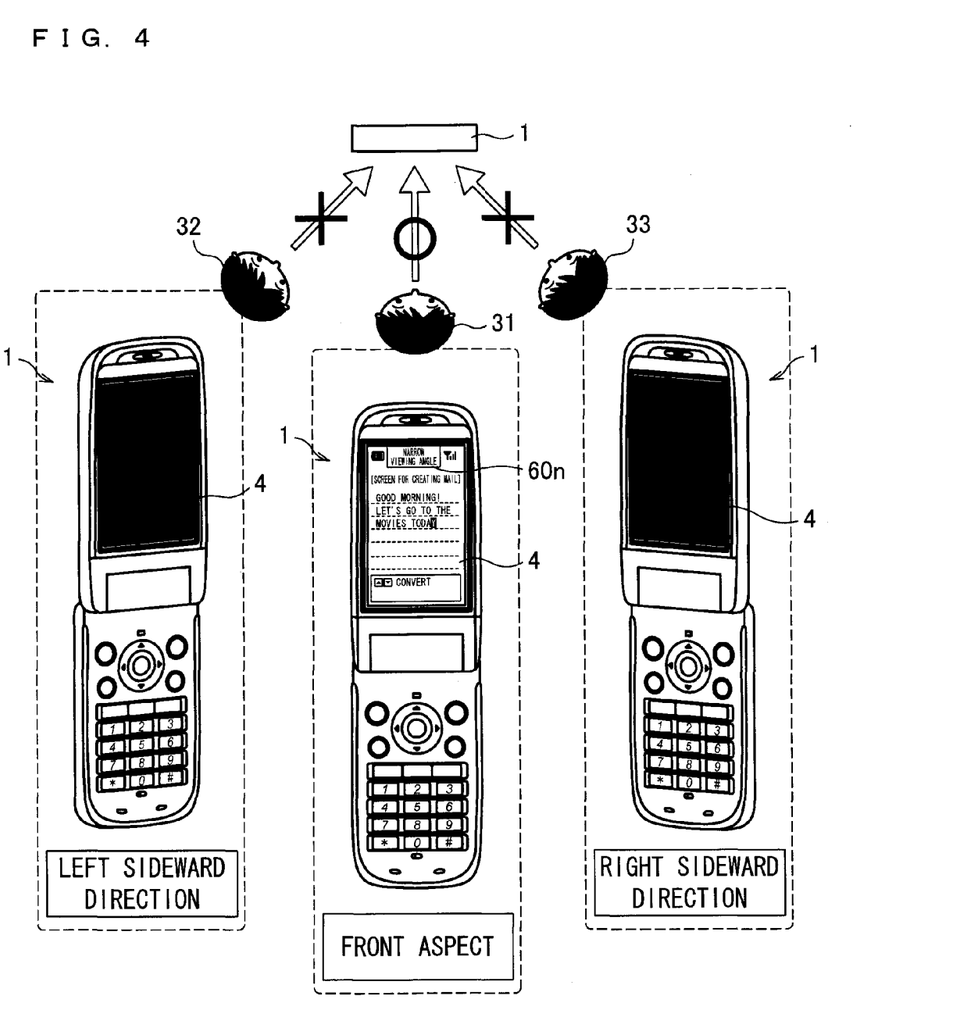
FIG. 4 is a drawing showing display screens that are visible from the front or sideward directions, when the portable phone is set in a narrow viewing-angle mode.

FIG. 3 shows an image to be seen by a person 31, who is in front of the main screen 4, and an image to be seen by persons 32 and 33, who are in sideward directions of the main screen 4, in the case where the main screen 4 becomes the wide viewing-angle mode automatically as a result that the camera 9 operates in taking moving images and photographs. FIG. 4 shows an image to be seen by the person 31, who is in front of the main screen 4, and an image to be seen by the persons 32 and 33, who are in the sideward directions of the main screen 4, in the case where the main screen 4 becomes the narrow viewing-angle mode automatically as a result that the user operates the input buttons 8 to create an electric mail.

As shown in FIG. 3, during the wide viewing-angle mode, the image on the main screen 4 is visible when the main screen 4 is seen from the direct front (front direction), from a sideward front on a right-hand side with respect to the main screen 4 (right sideward direction), or from a sideward front on a left-hand side with respect to the main screen 4 (left sideward direction). At this time, viewing-angle information 60w, which indicates a wide viewing angle, is displayed on the main screen 4.

On the other hand, during the narrow viewing-angle mode, as shown in FIG. 4, the image on the main screen 4 is visible from the front direction but invisible from the right sideward direction or the left sideward direction. From the right sideward direction or the left sideward direction, merely a display in black or a different image is visible. At this time, viewing-angle information 60n, which indicates a narrow viewing angle, is displayed on the main screen 4.

Figure 1:
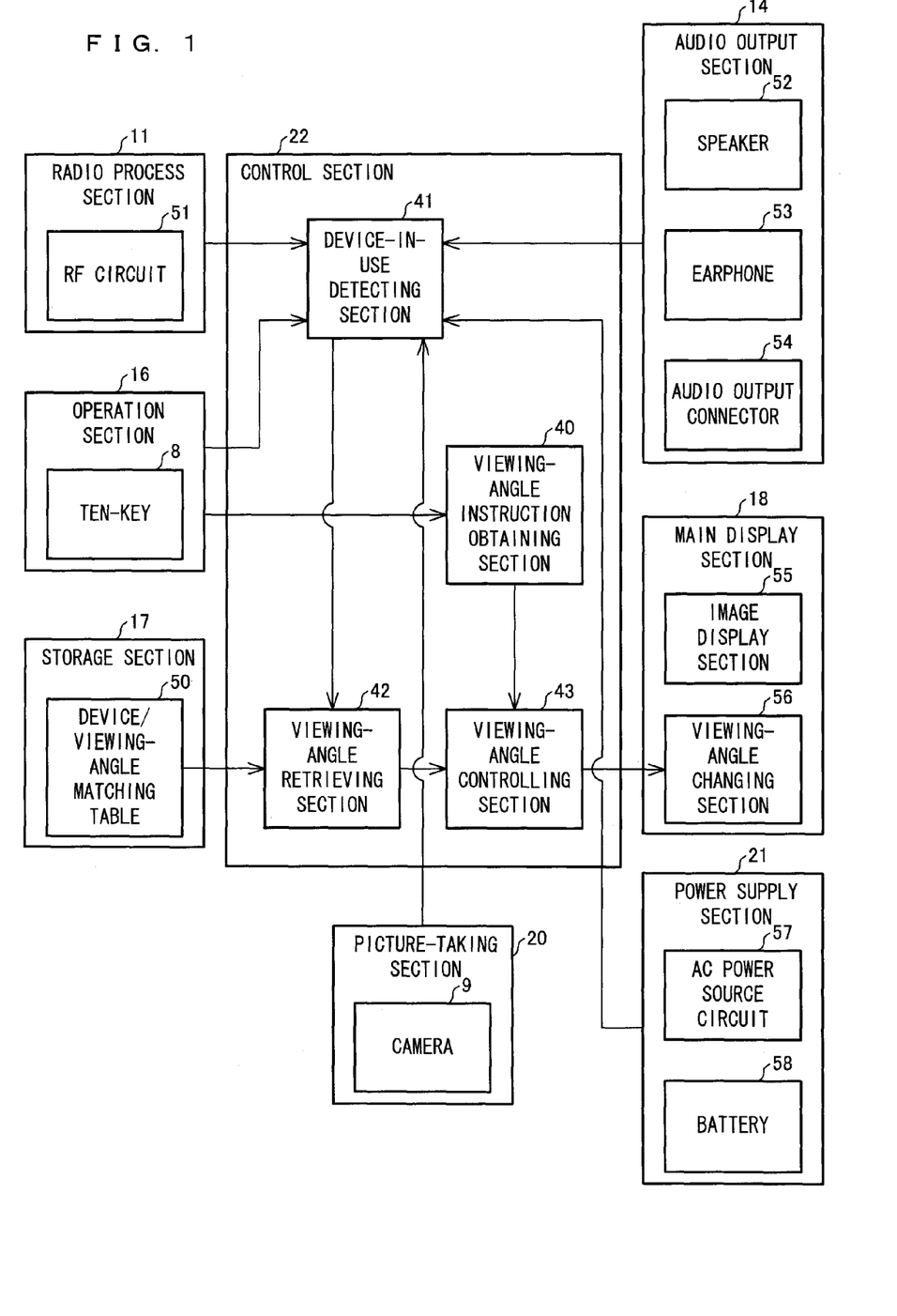
FIG. 1 is a block diagram showing a schematic structure of main sections of a portable phone, according to an embodiment of the present invention.
Figure 5:
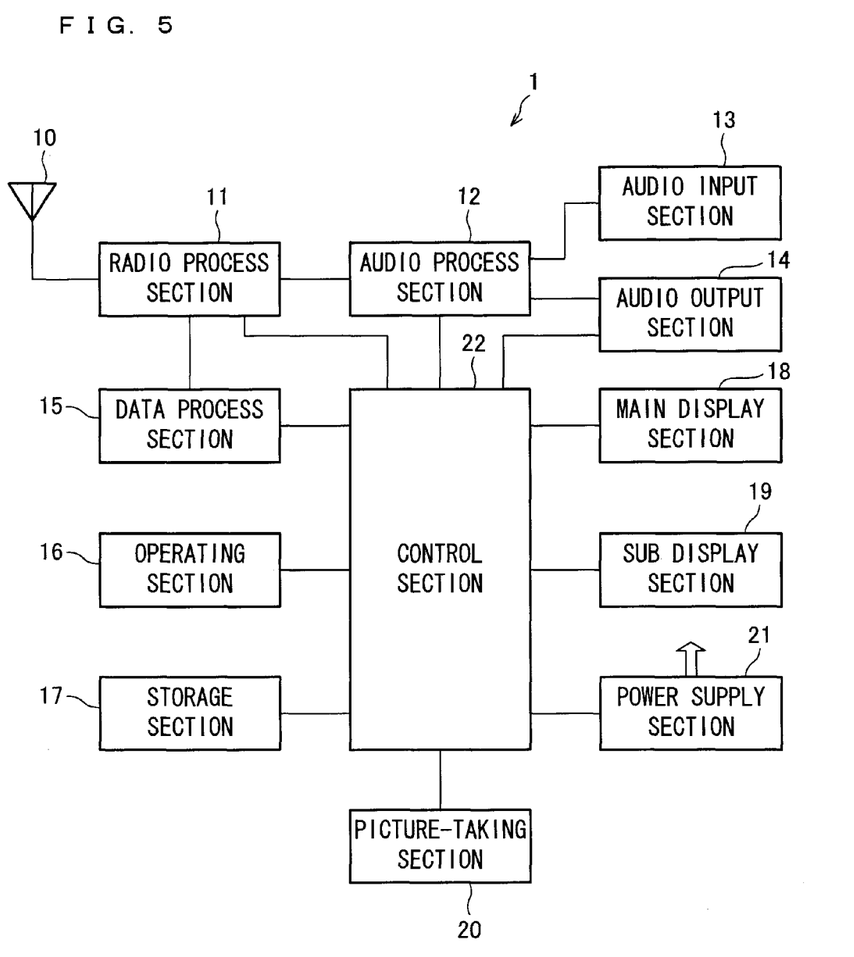
FIG. 5 is a block diagram showing a schematic structure of the portable phone.

The following discusses a detailed structure of the portable phone 1, with reference to FIGS. 1 and 5. FIG. 5 shows a schematic structure of the portable phone 1. The portable phone 1 includes an antenna section 10, a radio process section 11, an audio process section 12, an audio input section 13, an audio output section 14, a data process section 15, an operation section 16, a storage section (storing means) 17, a main display section (display device) 18, a sub display section 19, a camera section 20, and a control section (viewing-angle control device) 22.

The antenna section 10 transmits outward a radiowave, and receives an external radiowave. Specifically, the antenna section 10 transmits and receives a radiowave for portable phones in the bandwidth of 800 MHz or 1.5 GHz.

The radio process section 11 receives data from the audio process section 12 or the data process section 15, converts the data into a suitable form for wireless transmission, and then transmits outward, via the antenna section 10, a radio signal thus converted. Further, the radio process section 11 receives an external radio signal via the antenna section 10, converts the radio signal into an original format, and then transmits, to the audio process section 12 or the data process section 15, data thus converted. Specifically, a channel CODEC process, a baseband signal process, a data modulation/demodulation process, an RF (Radio Frequency) process, and the like are performed in the radio process section 11.

The audio process section 12 converts an audio signal supplied from the audio input section 13 into predetermined audio data, and then transmits the audio data to the radio process section 11. Further, the audio process section 12 converts audio data supplied from the radio process section 11 into an audio signal, and then transmits the audio signal to the audio output section 14. The audio process section 12 includes, concretely, an A/D converter, a D/A converter, an amplifier, and an audio CODEC circuit.

The audio input section 13 converts an externally-supplied sound wave into an audio signal that is an electric signal, and then transmits the audio signal to the audio process section 12. The audio input section 13 includes, concretely, a microphone.

The audio output section 14 converts the audio signal supplied from the audio process section 12 into a sound wave, and supplies outward the sound wave. The audio output section 14 includes, concretely, a speaker (audio non-contact transmitting means), an earphone (audio contact transmitting means), an audio output connector, and the like. In the portable phone 1, normally, the earphone is utilized in making a conversation, and the speaker is utilized in notifying of an incoming call. Further, in consideration to people in the surrounding area, a headphone is connected to the audio output connector in listening to the music.

It is desirable in telephones that user-voice to be fed into the audio input section 13 be heard from the audio output section 14. It is thus preferable that the audio process section 12 adjust the audio signal supplied from the audio input section 13 so that the audio signal becomes a predetermined level of sound volume, and then transmit the audio signal thus adjusted to the audio output section 14.

The data process section 15 performs encoding on data supplied from the control section 22 so that the data becomes data in predetermined form, and then transmits the data in the predetermined form to the radio process section 11. Further, the data process section 15 decodes the data supplied from the radio process section 11, and then transmits the data thus decoded to the control section 22. Exemplary methods of data encoding/decoding (CODEC) performed in the data process section 15 include MPEG (Moving Picture Experts Group)-4 and ITU-T recommendation H.263.

The operation section 16 creates operation data and transmits the operation data to the control section 22, when a user operates an input device such as the main operation buttons 6 provided on a surface of the portable phone 1. An exemplary input device besides a button switch includes a touch panel. Further, when a user operates a predetermined operation button, the operation section 16 creates operation data for giving an instruction to change the viewing angle, and transmits the operation data to the control section 22.

The storage section 17 stores various data and programs. Exemplary storage sections 17 include: a ROM (Read Only Memory) that is a read-only semiconductor memory for storing fixed data such as communication control data and a program necessary in operation of the control section 22; and a RAM (Random Access Memory) that is so-called working memory, and temporarily stores data relating to bar-code recognition and communications, data to be used in calculation, results of calculation, and the like.

Each of the main display section 18 and the sub display section 19 receives image data from the control section 22, and displays an image based on the image data thus received. Each of the main display section 18 and the sub display section 19 includes, concretely, a display element, e.g. a PDP (Plasma Display Panel), an LCD, and an EL (Electroluminescence) display, and a driver circuit to drive the display element on the basis of the image data thus received.

In the present embodiment, the main display section 18 has the following function. Specifically, the main display section 18 receives viewing-angle control data from the control section 22, and changes the viewing angle on the basis of the viewing-angle control data thus received. It is also possible that the sub display section 19 has the function to change the viewing angle.

The camera section 20 takes a moving image/photograph of an object or person, and creates video data. Specifically, the camera section 20 includes: a CCD (Charge Coupled Device) to convert, into an electric signal, light from the object or person; an imaging device such as a CMOS (Complementary Metal-oxide Semiconductor); and a video process circuit to convert an electric signal supplied by the imaging device into digital video data of RGB colors. The camera section 20 transmits the video data thus created to the control section 22.

The power supply section 21 supplies an adequate electric power to the configurations in the portable phone 1. The power supply section 21 is constituted of, for example, a rechargeable secondary battery, such as a lithium ion battery, and a power source circuit.

The control section 22 controls overall the configurations in the portable phone 1. The functions of the control section 22 are realized by a CPU (Central Processing Unit) executing a program stored in a storage unit such as an RAM or a flash memory.

FIG. 1 shows in detail a configuration, among the configurations in the portable phone 1, relating to operations to control the viewing angle on the basis of a status of use of various devices. As shown in the figure, and as discussed above, the radio process section 11 includes an RF circuit 51 to perform an RF process. Further, the audio output section 14 includes a speaker 52, an earphone 53, and an audio output connector 54. Further, the operation section 16 includes an input buttons (ten-key) 8. Further, the main display section 18 includes an image display section 55 to display an image on the main screen 4, and a viewing-angle changing section 56 to change the viewing angle in the image display section 55. Further, the camera section 20 includes a camera 9. Further, the power supply section 21 includes an AC power source circuit 57 for alternating current (AC), and a battery 58.

Figure 6:
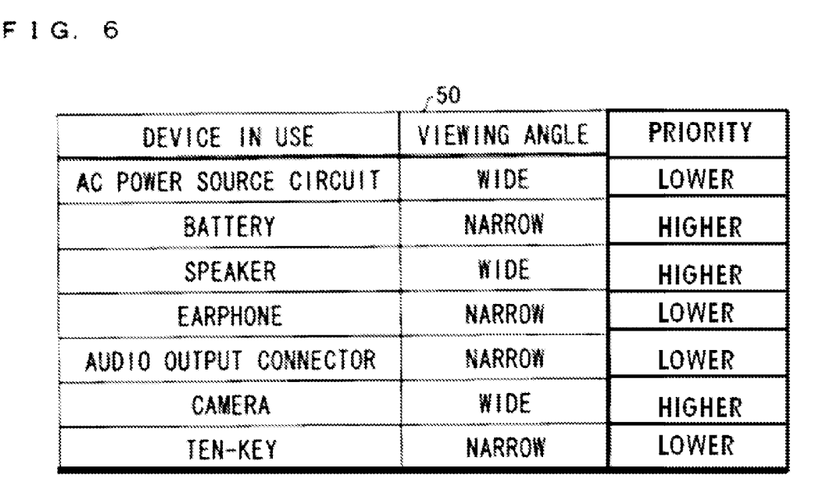
FIG. 6 is a chart in the form of table showing an exemplary device/viewing-angle matching table to be stored in a storage section of the portable phone.

The storage section 17 stores a device/viewing-angle matching table 50, which contains viewing-angle modes each associated with respective devices that are in use. FIG. 6 shows an exemplary device/viewing-angle matching table 50 in the form of table. In the case shown in the figure, the wide viewing-angle mode is set for the camera 9, and the narrow viewing-angle mode is set for the ten-key 8, for the reasons discussed above.

Further, the wide viewing-angle mode is set for the AC power source circuit 57, and the narrow viewing-angle mode is set for the battery 58. When the portable phone 1 is operating with the battery 58, the portable phone 1 is considered to be used in mobile-environment, and therefore privacy needs to be taken into consideration. This is why the modes are set accordingly.

Further, the wide viewing-angle mode is set for the speaker 52, the narrow viewing-angle mode is set for the earphone 53, and the narrow viewing-angle mode is set for the audio output connector 54. This is due to the following reasons. When the speaker 52 is in operation, sound is likely to be heard by plural persons. When the earphone 53 is in operation, the sound is likely to be heard solely by the user. When the audio output connector 54 is in use, that is, when the audio output connector 54 is coupled with another connector, no audio output is made in consideration of surrounding environment.

Back to FIG. 1, the control section 22 includes a viewing-angle instruction obtaining section 40, a device-in-use detecting section (device-in-use detecting means) 41, a viewing-angle retrieving section (viewing-angle retrieving means) 42, and a viewing-angle control section (viewing-angle controlling means) 43.

The viewing-angle instruction obtaining section 40 creates viewing-angle instruction data for changing the viewing angle, when receiving, from the operation section 16, the operation data for instructing to change the viewing angle. The viewing-angle instruction obtaining section 40 transmits the viewing-angle instruction data thus created to the viewing-angle control section 43. Note that it is also possible for the viewing-angle instruction obtaining section 40 to be linked to, besides the operation section 16, execution of a predetermined application to create the viewing-angle instruction data for giving an instruction on the viewing-angle state and then transmit the viewing-angle instruction data thus created to the viewing-angle control section 43.

The device-in-use detecting section 41 detects whether or not the various devices in the portable phone 1 are in use. Further, the device-in-use detecting section 41 transmits, to the viewing-angle retrieving section 42, information on a device that is detected being in use.

In the case shown in FIG. 1, the device-in-use detecting section 41 detects whether or not the following devices are in use: the RF circuit 51 of the radio process section 11; the speaker 52, the earphone 53, and the audio output connector 54 of the audio output section 14; the ten-key 8 of the operation section 16; the camera 9 of the camera section 20; and the AC power source circuit 57 and the battery 58 of the power supply section 21. Note that it is also possible for the device-in-use detecting section 41 to detect only a status of use of various devices that are set in the device/viewing-angle matching table 50.

It is possible to detect whether or not the devices are in use by detecting, for example, whether or not electric power is supplied to the devices, or whether or not a signal is fed to or supplied from the devices. Further, in the case where the device is a connector, such as the audio output connector 54, it is possible to deem the device to be in use when the connector is coupled to another connector.

The viewing-angle retrieving section 42 retrieves, from the device/viewing-angle matching table 50, a viewing-angle mode that corresponds to a device that the device-in-use detecting section 41 detects being in use. The viewing-angle retrieving section 42 transmits, to the viewing-angle control section 43, viewing-angle instruction data that is viewing-angle mode information thus retrieved.

The viewing-angle control section 43 controls the viewing-angle changing section 56 on the basis of the viewing-angle instruction data supplied from the viewing-angle instruction obtaining section 40 and the viewing-angle retrieving section 42. Specifically, when receiving the viewing-angle instruction data for changing the viewing-angle state, the viewing-angle control section 43 controls the viewing-angle changing section 56 so as to change the viewing-angle state. Further, the viewing-angle control section 43 retains the current viewing-angle state, and, when the viewing-angle state specified by the viewing-angle instruction data obtained is different from the current viewing-angle state, the viewing-angle control section 43 controls the viewing-angle changing section 56 so as to change the viewing-angle state to that specified by the viewing-angle instruction data.

Note that it is possible to indicate the viewing-angle state by indicating an actual value of the viewing angle or a level of the viewing angle, e.g. wide viewing-angle, narrow viewing-angle, and intermediate viewing-angle. In the present embodiment, a wide viewing-angle, which indicates that the viewing angle is wide, and a narrow viewing-angle, which indicates that the viewing angle is narrow, are employed to indicate the viewing-angle state.

Figure 7:
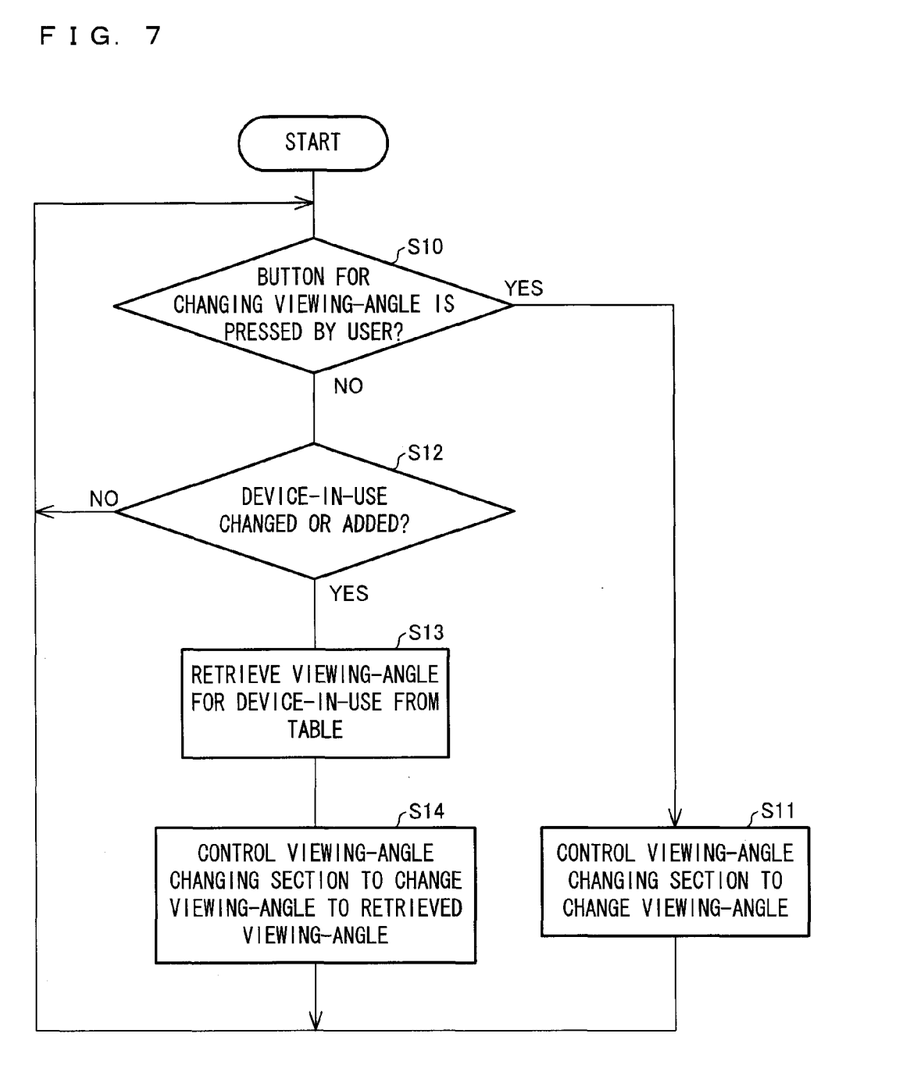
FIG. 7 is a flowchart showing a flow of operations for controlling the viewing angle, which operations are to be performed in a control section of the portable phone.

The following discusses operations to be performed in the portable phone 1 having the above configurations, with reference to FIG. 7. FIG. 7 shows operations to be performed in the control section 22 for controlling the viewing angle to be changed on the basis of a status of use of various devices.

As shown in FIG. 7, first of all, the viewing-angle instruction obtaining section 40 determines whether or not the user presses a predetermined viewing-angle changing button in the operation section 16 to conduct an operation to change the viewing angle (step S10 (Hereinafter, the step is sometimes abbreviated as "S10". This also applies to the other steps.)). If the operation to change the viewing angle is conducted (YES in S10), then the viewing-angle control section 43 controls the viewing-angle changing section 56 to change the viewing angle (S11). Thereafter, the flow of the operations moves back to the first step, S10, to repeat the above operations.

On the other hand, if no operation is conducted to change the viewing angle (NO in S10), then the device-in-use detecting section 41 determines whether or not there is a change in or an addition to the devices that are in use (S12). If there is no change in or no addition to the devices that are in use (NO in S12), then the flow of the operations moves back to the first step, S10, to repeat the above operations.

If there is a change in or an addition to the devices that are in use (YES in S12), then the viewing-angle retrieving section 42 retrieves a viewing angle corresponding to a changed or added device from the device/viewing-angle matching table 50 (S13). Then, the viewing-angle control section 43 controls the viewing-angle changing section 56 so that the viewing angle becomes the retrieved viewing angle (S14). By the foregoing way, the viewing angle is controlled on the basis of a status of use of various devices. Thereafter, the flow of the operations moves back to the first step, S10, to repeat the above operations.

The present invention is not limited to the description of the embodiments above, but may be altered by a skilled person within the scope of the claims. An embodiment based on a proper combination of technical means disclosed in different embodiments is encompassed in the technical scope of the present invention.

For example, the above embodiment discusses the case in which the present invention is applied to the portable phone 1. However, the present invention is not limited to the case. The present invention is applicable to any portable electronics devices, such as PHS (Personal Handy-phone System) PDA, mobile PC (Personal Computer), and portable DVD (Digital Versatile Disk), as long as the portable electronics devices include a display apparatus having the function of controlling the viewing angle. The present invention is also applicable to stationary displays.

Further, although the above embodiment employs only two viewing-angle modes, which are a wide viewing-angle mode and a narrow viewing-angle mode, it is also possible to employ more viewing-angle modes. For example, it is possible to provide an intermediate viewing-angle mode in which the viewing angle is neither wide nor narrow. This viewing-angle mode is suitable for the case in which the display screen is seen by two to three people including the user.

Further, there may be a case in which the viewing-angle retrieving section 42 retrieves plural viewing-angle modes for plural devices that are in use. Hence, a priority may be set in the device/viewing-angle matching table 50 for every device, and the viewing-angle retrieving section 42 may transmit, to the viewing-angle control section 43, information on the viewing-angle mode with a high priority, as the viewing-angle instruction data, an example of which being shown in FIG. 6.

Further, in the above embodiment, the viewing-angle mode is set in such a way as to become the narrow viewing-angle mode when the input buttons 8 are operated. However, there may be a case in which a user operates the input buttons 8 accidentally. It is bothersome for the user that the viewing-angle mode is changed from the wide viewing-angle mode to the narrow viewing-angle mode each time the input buttons 8 are operated accidentally. Thus, the viewing-angle mode may be set in such a way as to become the narrow viewing-angle mode when the input buttons 8 are operated at least for a predetermined number of times within a predetermined period of time.

Further, in place of, or together with, the earphone 53 of the audio output section 14 in the above embodiment, it is also possible to use other audio contact transmitting means for transmitting audio information with contacting the user, such as a headphone and a bone conduction vibrator. In this case, it is preferable that the viewing angle mode becomes the narrow viewing-angle mode when the audio contact transmitting means is in use.

Further, it is possible for the respective blocks, especially the control section 22, in the portable phone 1 to be configured on the basis of hardware logic, or to be realized with software by using a CPU as discussed below.

Specifically, the portable phone 1 includes: a CPU for executing an instruction of a control program for realizing respective functions; a ROM for storing the program; a RAM for developing the program; and a storage unit (a storage medium), such as a memory, for storing the program and various data. The object of the present invention is also achieved by (i) supplying, to the portable phone 1, a computer-readable storage medium storing a program code (execute form program, intermediate code program, source program) of a control program of the portable phone 1, which control program is software for realizing the functions discussed above, and (ii) causing a computer (or CPU or MPU) to read out and carry out the program code stored in the storage medium.

Exemplary storage medium that may be used as the storage medium discussed above include: tapes such as a magnetic tape and a cassette tape; disks such as an magnetic disk (e.g., flexible disk, hard disk) and an optical disk (e.g., CD-ROM, MO, MD, DVD, CD-R); cards such as an IC card (including memory card) and an optical card; and semiconductor memories such as a mask ROM, an EPROM, an EEPROM, and a flash ROM.

Further, it is also possible to make an arrangement that the portable phone 1 is allowed to be connected to a communication network, and the program code is supplied via the communication network. The communication network is not particularly limited, and the followings may be used as the communication network, for example: the Internet, intranet, extranet, LAN, ISDN, VAN, CATV communication network, virtual private network, telephone line network, mobile communication network, and satellite communication network. Further, transmission medium that configure the communication network is not particularly limited, and the followings may be used, for example: a wire transmission medium, such as IEEE 1394, USB, power-line carrier, cable TV circuit, telephone line, ADSL circuit, and wireless such as infrared ray (e.g., IrDA, remote-controller), Bluetooth®, wireless 802.11, HDR, mobile telephone network, satellite circuit, and terrestrial digital network. The present invention is also realized in the form of a carrier or data signal sequence that is realized by electrical transmission of the program code.

A viewing-angle control device of the present invention for controlling a viewing angle of a display device may be configured in such a way as to control the viewing angle of the display device on the basis of a status of use of one or plural devices.

Specifically, the viewing-angle control device according to the present invention may include: device-in-use detecting means for detecting use of the one or plural devices; storing means for storing a correspondence relationship between a device to be used and the viewing angle; viewing-angle retrieving means for retrieving, from the correspondence relationship, a viewing angle corresponding to the device that is being in use as detected by the device-in-use detecting means; and viewing-angle controlling means for controlling the viewing angle of the display device on the basis of the viewing angle that is retrieved by the viewing-angle retrieving means.

It is possible to indicate the viewing angle by indicating an actual value thereof or a level of the viewing angle, e.g. the viewing angle is wide, or the viewing angle is narrow.

In the above configuration, the viewing angle of the display device is controlled not on the basis of a status of use of an application but a status of use of various devices. Hence, the viewing angle is set not for every application to be used but for every device to be used.

Generally, plural pieces of software are utilized with respect to one hardware such as a device. For example in a portable phone with a camera, the camera is utilized in taking a moving image and in taking a photograph, and ten-keys are utilized in inputting telephone numbers to call, creating electronic mails, and registering in a telephone directory.

Hence, the viewing-angle control device of the present invention allows the viewing angle to be controlled automatically on the basis of the status of use, with a fewer settings than before.

It is preferable that the display device be controlled the display device to display information on the viewing angle. In this case, a user can easily find out the viewing angle by simply looking at the display screen of the display device, even when the viewing angle is changed automatically on the basis of a status of use of various devices.

Further, it is possible to select any display style in displaying the viewing angle, including: displaying by use of a series of characters; displaying by use of an icon; displaying at an upper end section, a lower end section, or a corner section of the display screen; displaying at a central section of the display screen in such a way as to superimpose with other images; and displaying by use of a moving image.

Further, a display apparatus including a display device with a viewing angle that is variable and the viewing-angle control device having the above configuration and controlling the viewing angle of the display device also produces the above advantageous effects. It is effective especially for portable display apparatuses.

Concrete examples in which a viewing-angle control device controls a viewing angle of a display device on the basis of a status of use of devices are discussed below.

For example, the viewing-angle control device controls the viewing angle of the display device in a manner such that the viewing angle becomes the narrow viewing angle when a power supply inside of the display apparatus is in use, and the viewing angle becomes the wide viewing angle when a power supply outside of the display apparatus is in use.

Further, the display apparatus further includes: audio contact transmitting means for transmitting audio information to a user by being substantially in contact with the user; and audio non-contact transmitting means for transmitting audio information to a user without being in contact with the user, the viewing-angle control device controlling the viewing angle of the display device in a manner such that the viewing angle becomes the narrow viewing angle when the audio contact transmitting means is in use, and the viewing angle becomes the wide viewing angle when the audio non-contact transmitting means is in use.

Examples of the audio contact transmitting means include an earphone, a headphone, and a bone conduction vibrator. Generally, these are utilized by one person or a few limited number of persons to listen to sounds. Thus, the sounds are less likely to be heard by someone else. Hence, in the case where the audio contact transmitting means is in use, it is preferable that the display apparatus perform displaying in the narrow viewing angle, as it is expected to be used in such a way as not to be heard by someone else.

On the other hand, an example of the audio non-contact transmitting means is a speaker. Sounds coming from the speaker are likely to be heard by someone else. Thus, in the case where the audio non-contact transmitting means is in use, the display apparatus may perform displaying in the wide viewing angle, as it is expected to be used in such a way as to allow someone else to hear.

Further, the display apparatus further includes input means for receiving information that is input by a user, and the viewing-angle control device controls the viewing angle of the display device in a manner such that the viewing angle becomes the narrow viewing angle when the input means is in use.

Further, it is preferable that the display apparatus according to the present invention further include operating means for accepting an operation performed by a user, and that the viewing-angle control device control the viewing angle of the display device in a manner such that the viewing angle is changed when the operating means accepts a predetermined operation.

In this case, the user can operate to change the viewing angle of the display device. This allows the viewing angle to be changed to a viewing angle that the user desires, and thus improves the convenience of the user.

Further, it is preferable in the display apparatus according to the present invention that the viewing-angle control device notify a user when a viewing angle to be controlled on a basis of a status of use of the one or plural devices is different from a viewing angle changed as a result that the operating means accepts the predetermined operation.

In this case, when the current viewing angle that has been changed by the user is different from a viewing angle that is predetermined on the basis of a status of use of the devices, the user is notified thereof. This notification to the user is carried out with any ways of notification, including images, sound, and vibration.

The method according to the present invention for controlling a viewing-angle control device is adapted so that the viewing angle of the display device is controlled on the basis of a status of use of one or plural devices.

In the above method, the viewing angle of the display device is controlled not on the basis of a status of use of an application but a status of use of various devices. Hence, the viewing angle is set not for every application to be used but for every device to be used. Hence, the method according to the present invention for controlling a viewing-angle control device allows the viewing angle to be controlled automatically on the basis of the status of use, with a fewer settings than before.

The viewing-angle control device is executable on a computer by use of a viewing-angle control program. Further, the viewing-angle control program is executable on any computers by storing the viewing-angle control program in a computer-readable storage medium.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

A viewing-angle control device according to the present invention controls a viewing angle of a display device on the basis of a status of use of various devices. Therefore, the viewing-angle control device according to the present invention is applicable to not only portable display apparatuses but also any display apparatuses having a function of controlling the viewing angle.

The invention claimed is:

1. A control device arranged to control a viewing angle of a display device, said control device comprising:
   a storing section arranged to store in advance a correspondence relationship between a plurality of devices capable of being used and the viewing angle;
   a device-in-use detecting section arranged to detect use of each of the plurality of devices that are actually being used;
   a viewing-angle retrieving section arranged to retrieve a viewing angle corresponding to the plurality of devices that are actually being used as detected by the device-in-use detecting section from the correspondence relationship stored in the storing section; and
   a viewing-angle controlling section arranged to control the viewing angle of the display device on a basis of the viewing angle retrieved by the viewing-angle retrieving section; wherein
   the correspondence relationship includes priority information for each of the plurality of devices capable of being used, such that when the device-in-use detecting section detects the use of the plurality of devices that are actually being used, the viewing-angle controlling section is arranged to control the viewing angle of the display device to be a viewing angle corresponding to one of the plurality of devices that are actually being used that has a highest priority among the plurality of devices that are actually being used as detected by the device-in-use detection section.

2. The control device according to claim 1, further arranged to control the display device to display information on the viewing angle.

3. The control device according to claim 1, wherein
   the correspondence relationship associates (i) an input device with which a user inputs information and (ii) a narrow viewing-angle; and
   the device-in-use detecting section is arranged to detect use of the input device by detecting whether or not the input device is operated by a user for at least a predetermined plural number of times within a predetermined period of time to control the viewing angle of the display device to be a narrow viewing angle in a case where the input device is operated for the at least a predetermined plural number of times within the predetermined period of time.

4. The control device according to claim 1, wherein the correspondence relationship associates an audio non-contact transmitting device that transmits audio information to a user without being in contact with the user with a wide viewing angle, and sets the audio non-contact transmitting device as having a high priority, such that the viewing angle of the display device will be controlled to be the wide viewing angle when the audio non-contact transmitting device is detected by the device-in-use detecting section.

5. A display apparatus, comprising:
   a display device with a viewing angle that is variable; and
   the control device of claim 1 arranged to control the viewing angle of the display device.

6. The display apparatus according to claim 5, wherein the display apparatus is portable.

7. A tangible computer-readable storage medium storing a viewing-angle control program for causing a viewing angle of a display apparatus defined in claim 5 to be controlled,
   the viewing-angle control program causing a computer to function as the control device.

8. The display apparatus according to claim 5, wherein the correspondence relationship stored in the storing section relates a narrow viewing angle with a determination of use of a power supply inside of the display apparatus and relates a wide viewing angle with a determination of a use of a power source circuit for a power supply outside of the display apparatus.

9. The display apparatus according to claim 5, further comprising:
   an audio contact transmitting device arranged to transmit audio information to a user while being substantially in contact with the user; and
   an audio non-contact transmitting device arranged to transmit audio information to the user without being in contact with the user; wherein
   the correspondence relationship stored in the storing section relates a narrow viewing angle with the audio contact transmitting device and relates a wide viewing angle with the audio non-contact transmitting device.

10. The display apparatus according to claim 5, further comprising:
    an operating device arranged to accept an operation performed by a user, wherein
    the control device further comprises a viewing-angle instruction obtaining section arranged to obtain an instruction for a viewing angle from the operating device; and
    the viewing-angle controlling section controls the viewing angle of the display device on the basis of the viewing angle obtained by the viewing-angle instruction obtaining section.

11. The display apparatus according to claim 10, wherein the viewing-angle controlling section notifies the user when the viewing angle retrieved by the viewing-angle retrieving section is different from the viewing angle obtained by the viewing-angle instruction obtaining section.

12. A method for controlling a viewing angle of a display device, the method comprising the steps of:
    detecting a use of a plurality of devices that are actually being used;
    retrieving a viewing angle corresponding to the plurality of devices that are actually being used as detected in the detecting step, from a correspondence relationship between each of the plurality of devices that are actually being used and a viewing angle, the correspondence relationship being stored in a storing section in advance; and
    controlling the viewing angle of the display device based on the viewing angle retrieved in the retrieving step; wherein
    the correspondence relationship includes priority information for each of the plurality of devices that are actually being used as detected in the detecting step such that when the use of the plurality of devices that are actually being used is detected in the detecting step, the controlling step controls the viewing angle of the display device to be a viewing angle corresponding to one of the plurality of devices that are actually being used having a highest priority among the plurality of devices that are actually being used as detected in the detecting step.

13. The method for controlling a viewing angle of a display device according to claim 12, wherein
the correspondence relationship associates (i) an input device with which a user inputs information and (ii) a narrow viewing-angle; and
the detecting step detects the use of the input device by detecting whether or not the input device is operated by a user for at least a predetermined plural number of times within a predetermined period of time to control the viewing angle of the display device to be a narrow viewing angle when the input device is operated for the at least a predetermined plural number of times within the predetermined period of time.

\* \* \* \* \*